United States Patent
Loh et al.

(10) Patent No.: US 6,745,225 B2
(45) Date of Patent: Jun. 1, 2004

(54) METHOD AND A DEVICE FOR ENABLING INTERCOMMUNICATION AMONG USER PROCESSES IN A COMMUNICATION MANAGEMENT SYSTEM REGARDLESS OF THE AVAILABILITY OF THE USER PROCESSES

(75) Inventors: Thiam Wah Loh, Singapore (SG); Yih Yeong Chong, Singapore (SG)

(73) Assignee: Hewlett-Packard Development Company, LP., Houston, TX (US)

( * ) Notice: Subject to any disclaimer, the term of this patent is extended or adjusted under 35 U.S.C. 154(b) by 477 days.

(21) Appl. No.: 09/832,742

(22) Filed: Apr. 10, 2001

(65) Prior Publication Data

US 2002/0152329 A1 Oct. 17, 2002

(51) Int. Cl.[7] .............................................. G06F 15/16
(52) U.S. Cl. ........................................ 709/202; 719/317
(58) Field of Search ................................ 709/317, 312, 709/313, 315, 316, 202, 203, 217, 218, 219, 220, 228; 719/317, 310

(56) References Cited

U.S. PATENT DOCUMENTS

| | | | | |
|---|---|---|---|---|
| 5,424,724 A | * | 6/1995 | Williams et al. ............. | 370/403 |
| 5,729,472 A | * | 3/1998 | Seiffert et al. ............... | 702/188 |
| 6,128,647 A | * | 10/2000 | Haury ......................... | 709/207 |
| 6,301,609 B1 | * | 10/2001 | Aravamudan et al. ...... | 709/207 |
| 6,430,604 B1 | * | 8/2002 | Ogle et al. ................... | 709/207 |
| 6,434,610 B1 | * | 8/2002 | Wahl ........................... | 709/219 |
| 6,513,065 B1 | * | 1/2003 | Hafez et al. ................. | 709/224 |
| 6,523,066 B1 | * | 2/2003 | Montroy et al. ............. | 709/229 |
| 6,539,446 B1 | * | 3/2003 | Chan ........................... | 710/200 |
| 6,604,127 B2 | * | 8/2003 | Murphy et al. .............. | 709/203 |
| 6,658,454 B1 | * | 12/2003 | Delany et al. ............... | 709/202 |
| 6,691,165 B1 | * | 2/2004 | Bruck et al. ................. | 709/227 |

OTHER PUBLICATIONS

Mustafa, "System and method for providing on–line assistance through the use of interactive data . . . ", U.S. 2002/0059378, May 16, 2002.*
Yamada et. al. "User support apparatus and system using agents", U.S. 2002/0052913, May 2, 2002.*
Perinpananthan, "Method and System for online/offline services", U.S. 2002/0083145, Jun. 27, 2002.*

* cited by examiner

Primary Examiner—John Follansbee
Assistant Examiner—Haresh Patel

(57) ABSTRACT

A method for user processes, each having a unique user identification code, to intercommunicate within a communication management system even if one of the user processes is unavailable, comprises the following steps: associating an agent process with a particular user identification code in order to correspond to a user process having the particular user identification code; determining whether the user process is available in the communication management system; causing the agent process to log into the communication management system with the particular user identification code when the user process is unavailable; and enabling the agent process to intercommunicate with user processes within the communication management system instead of the unavailable user process by using the particular user identification code of the unavailable user process.

8 Claims, 3 Drawing Sheets

METHOD AND A DEVICE FOR ENABLING INTERCOMMUNICATION AMONG USER PROCESSES IN A COMMUNICATION MANAGEMENT SYSTEM REGARDLESS OF THE AVAILABILITY OF THE USER PROCESSES

BACKGROUND OF THE INVENTION

The invention related to a method and a device for enabling intercommunication among user processes in communication management system regardless of the availability of the user processes.

A messenger service as known for instance from Yahoo!® Messenger, MSN® Messenger, or ICQ® ("I seek you") is a communication management system, which is generally a network based application, and provides usually two different services, which are generally known. The two different services usually comprise a user online information service and a user message forwarding service. All messenger services have in common, that a user process has to be registered to the individual messenger service for using its features, and that every user process has to define an electronic list of friends incorporating other registered user processes for using both mentioned services of the corresponding messenger service.

The user online information service informs a first user process about the status of a second user process if the first user process is named in the list of friends of the second user process. The phrase "status of a user process" stands for the user online information, which can take one of the two values "online" and "offline" with regard to the presence of the second user process in the communication management system. If a user process is not online or just not available for quite some time, the corresponding status has the value "offline", otherwise it has the value "online".

The user message forwarding service is usually an electronic mail service or an electronic chat service between different user processes corresponding to the same messenger service. If at least two user processes are online in the communication management system, registered to the same messenger service and named in each others list of friends, the user message forwarding service connects the user processes and enables intercommunication between the user processes.

FIG. 2 shows an intercommunication system 200 according to the prior art. A messenger service (MS) 202 as well as a first user process (UP1) 203 and a second user process (UP2) 204 are connected to a communication management system 201. Therefore, the first user process 203 and the second user process 204 have the status "online". A third user process (UP3) 205 is not connected to the communication management system 201, i.e., it has the status "offline". All user processes 203, 204 and 205 are registered user processes in the messenger service 202. Only the first user process 203 and the second user process 204 are able to communicate with one another via the communication management system 201 and employing the messenger service 202 due to their status. The first user process 203 and the second user process 204 have no possibility to communicate with the third user process 205.

According to the described prior art a user process can be seen to be available in a communication management system if the user process is logged into a messenger service as well as any communication can take place with the user process using the communication management system as transmission medium. This means for example, that for an available user process an electronic data transmission connection must actually exist between the communication management system and the user process for transferring data between the messenger service and the user process.

A disadvantage of the above mentioned messenger services is, that a user process can communicate only with another user process if both user processes are available in the communication management system. A further disadvantage is the possibility, that the status of a user process can be "online" even if the user process is unavailable, e.g., a user process is signed in as being "online" in the messenger service but is not able to log off due to an interruption of the electronic connection to the communication management system. From both mentioned cases, the following general disadvantage results: If a user process sends a message to an unavailable user process via a communication management system this message is not processed, and, therefore, the sending user process is not able to receive an answer to its message.

SUMMARY OF THE INVENTION

One main aspect of the invention is to provide a possibility to enable intercommunication between at least two user processes via a communication management system even if one of the at least two user processes is not available in the communication management system.

A method for user processes, each having a unique user identification code, to intercommunicate within a communication management system even if one of the user processes is unavailable, comprises the following steps: associating an agent process with a particular user identification code in order to correspond to a user process having the particular user identification code; determining whether the user process is available in the communication management system; causing the agent process to log into the communication management system with the particular user identification code when the user process is unavailable; and enabling the agent process to intercommunicate with user processes within the communication management system instead of the unavailable user process by using the particular user identification code of the unavailable user process.

A computer device for user processes, each having a unique user identification code, to intercommunicate within a communication management system even if one of the user processes is unavailable, comprises a processing unit being programmed such that it can perform the following steps: associating an agent process with a particular user identification code in order to correspond to a user process having the particular user identification code; determining whether the user process is available in the communication management system; causing the agent process to log into the communication management system with the particular user identification code when the user process is unavailable; and enabling the agent process to intercommunicate with user processes within the communication management system instead of the unavailable user process by using the particular user identification code of the unavailable user process.

One advantage of the invention over the prior art is, that an available user process can save time by avoiding unsuccessful message transfers to an unavailable user process. Another advantage of the invention is that a user process that goes offline remains virtually online, such that no other user process knows about the real status of the user process.

DETAILED DESCRIPTION OF PREFERRED EMBODIMENTS OF THE INVENTION

Preferred embodiments of the invention will now be described with reference to the attached drawings in which like parts or elements are denoted by like reference numbers.

Figure 1:
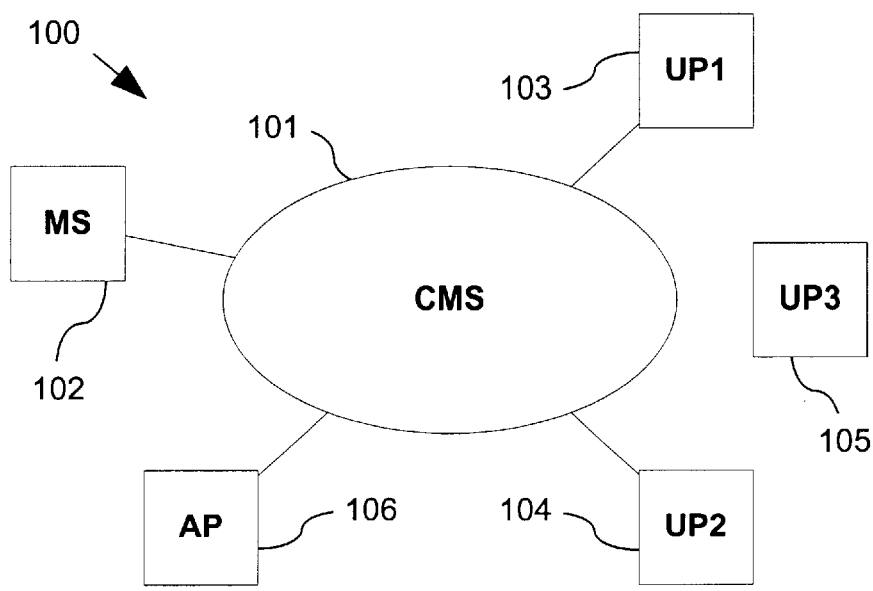
FIG. 1 shows an intercommunication system according to a first embodiment of the invention in a first mode.
Figure 2:
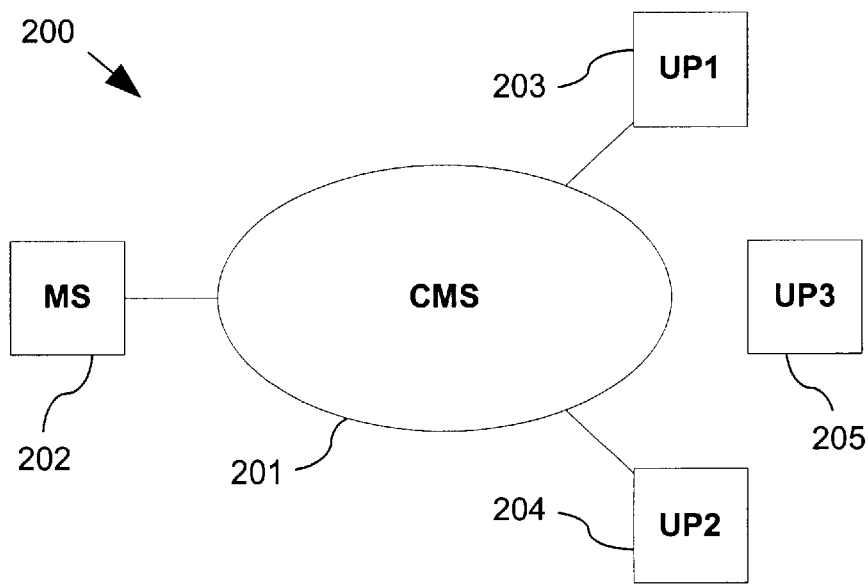
FIG. 2 shows an intercommunication system according to the prior art.

FIG. 1 shows an intercommunication system 100 according to a first embodiment of the invention in a first mode. A messenger service (MS) 102 as well as a first user process (UP1) 103, a second user process (UP2) 104 and an agent process (AP) 106 are connected to a communication management system 101. Therefore, the first user process 103, the second user process 104 and the agent process 106 are available in the communication management system 101. A third user process (UP3) 105 is not connected to the communication management system 101, i.e., is not available in the communication management system 101. All user processes 103, 104 and 105 are registered user processes in the messenger service 102. The agent process 106 determines whether one of the three user processes 103, 104 and 105 is available via the communication management system 101. Due to the fact, that the third user process 105 is currently not available in the communication management system 101, the agent process 106 is logged into the communication management system 101 as virtual third user process in the first mode of the first embodiment of the invention.

Every user process has a unique user identification code in the communication management system 101 which is used for identifying each user process by the messenger service 102. If the agent process 106 is logged into the communication management system 101 as a virtual user process for an unavailable user process, the agent process 106 uses the user identification code of the unavailable user process for logging into the communication management system 101. Therefore, the messenger service 102 signs in the agent process 106 imitating the unavailable user process. Accordingly, the messenger service 102 is not able to decide if a user process is really available or if the agent process 106 imitates an unavailable user process.

According to this embodiment it is possible for the first user process 103 and the second user process 104 to communicate via the communication management system 101 and employing the messenger service 102 with one another as well as with the virtual third user process. The third user process 105 seems to be available for the first user process 103 and the second user process 104 due to the agent process 106 logged in as virtual third user process. Therefore, there is no possibility for other user processes to get real information about the availability of the third user process 106.

Figure 3:
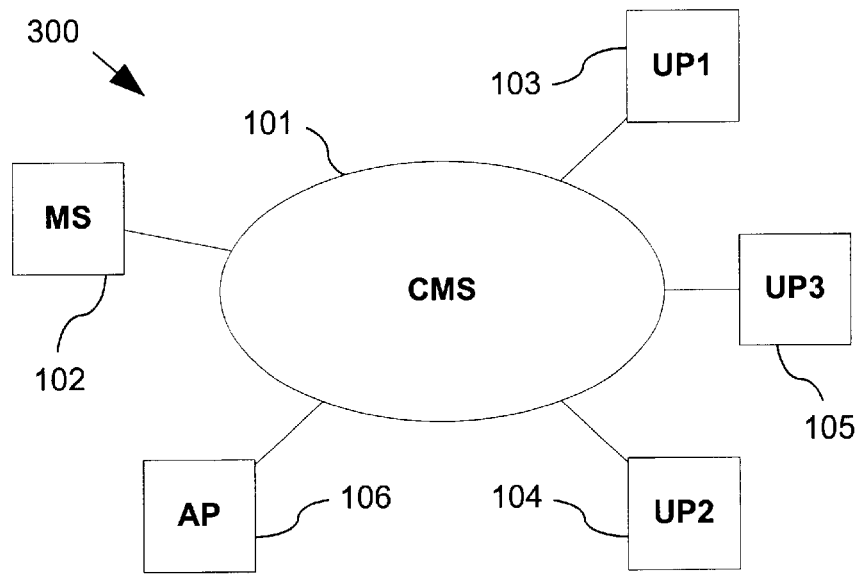
FIG. 3 shows an intercommunication system according to the first embodiment of the invention in a second mode.

FIG. 3 shows an intercommunication system 300 according to the first embodiment of the invention in a second mode. The intercommunication system 300 comprises the same elements as already described with reference to FIG. 1. The difference between the intercommunication system 100 of FIG. 1 and the present intercommunication system 300 is the availability of the third user process 105 in the communication management system 101. Consequently, the agent process 106 is not logged in as virtual third user process in the communication management system 101.

If the first user process 103 or the second user process 104 communicate with the third user process 105, they really communicate with the third user process 105 and not with the agent process 106 as virtual user process. As all three user processes 103, 104 and 105 are available in the communication management system 101 in this mode of the first embodiment of the invention, the agent process 106 is not logged in as a virtual user process, but determines the availability of the three user processes 103, 104 and 105.

Figure 4:
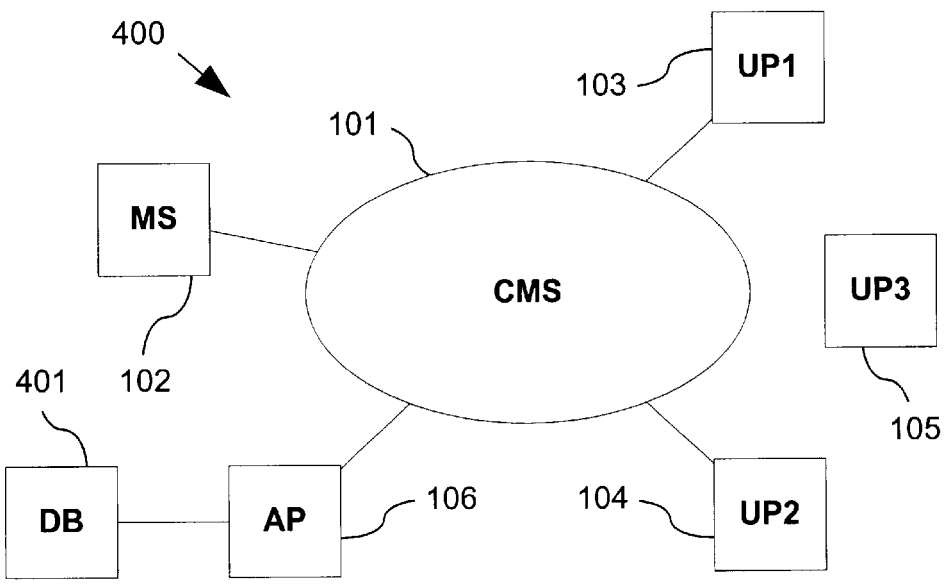
FIG. 4 shows an intercommunication system according to a second embodiment of the invention.

FIG. 4 shows an intercommunication system 400 according to a second embodiment of the invention. The intercommunication system 400 comprises mainly the same elements as already described with reference to FIG. 1. The difference between the intercommunication system 100 of FIG. 1 and the present intercommunication system 400 is the presence of a database (DB) 401 connected to the agent process 106. As the third user process 105 is not available in the communication management system 101 the agent process 106 is logged into the communication management system 101 as a virtual third user process.

If an available user process such as the first user process 103 or the second user process 104 wants to communicate via the communication management system 101 with an unavailable user process such as the third user process 105, the communication will take place between the available user process and the agent process 106. The available user process sends an original communication message to the unavailable user process and the agent process 106 receives the original communication message. Afterwards, the agent process 106 processes the original communication message. The processing of the agent process 106 can comprise a communication with the database to find a corresponding communication message. Finally, the agent process 106 sends the corresponding communication message to the available user process which has sent the original communication message at first.

It is also possible to connect additionally or alternatively to the database 401 a memory to the agent process 106 for saving original communication messages which cannot be processed by the agent process 106. For example, the original communication message is saved in the memory if no database 401 is present or if no corresponding communication message can be found in the database 401 to the original communication message. If there is connected a memory to the agent process 106, the unavailable user process had to add the agent process 106 to its list of friends before being not available. This is, because the unavailable user process has to be able to program the database 401 with a set of original communication messages as well as corresponding communication messages before being not available. Additionally or alternatively, the unavailable user process has to be able to query the memory for saved original communication messages after being available again.

Figure 5:
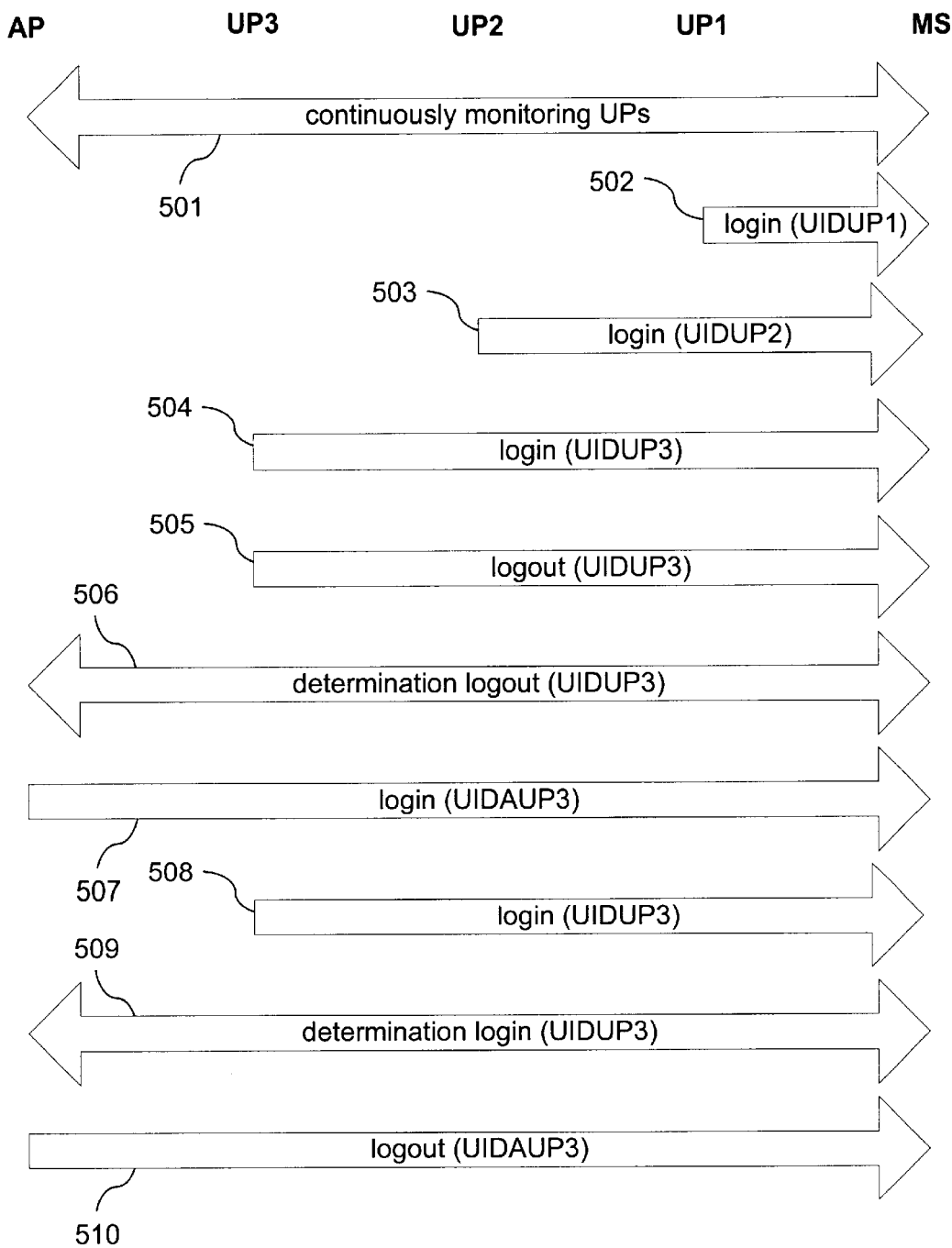
FIG. 5 shows a message flow diagram of the intercommunication system of the first embodiment of the invention.

FIG. 5 shows a message flow diagram of the intercommunication system 100 of the first embodiment of the invention. The intercommunication system 100 comprises five active components between which an electronic data transfer can take place via the communication management system. The active components of this embodiment are the messenger service MS, the first user process UP1, the second user process UP2, the third user process UP3 and the agent process AP.

The agent process AP is constantly connected via the communication management system to the messenger service MS and monitors (501) continuously the availability of the three user processes UPs. Above all, the three user processes UPs log into the messenger service MS. The first user process UP1 logs via the communication management system into the messenger service MS using its user identification code UIDUP1 for login (502). The second user process UP2 and the third user process UP3 log into the messenger service MS in the same way using their corresponding user identification code UIDUP2 or UIDUP3, respectively, for login (503, 504). The agent process AP monitors the login action and therefore it knows which user process is available. The three user processes UPs are now able to intercommunicate with each other via the communication management system.

Next, the third user process UP3 with the user identification code UIDUP3 logs out (505) of the messenger service MS. The agent process AP determines (506) the logout action of the third user process UP3 in the same moment and logs into the messenger service MS as virtual third user process using the user identification code UIDAUP3 (507). The messenger service MS signs in the agent process AP with the user identification code UIDAUP3 as third user process with the user identification code UIDUP3. Therefore, the first user process UP1 and the second user process UP2 are able to further intercommunicate with the third user process which is actually the agent process AP even though the third user process UP3 is not logged into the messenger service MS. The first user process UP1 and the second user process UP2 are not able to detect if they are intercommunicating with the real third user process UP3 or the agent process AP logged in as virtual third user process.

Further, the third user process UP3 with the user identification code UIDUP3 logs into the messenger service MS again (508). The agent process AP determines (509) the login action of the third user process UP3 in the same moment and logs out (510) of the messenger service MS as virtual third user process.

Finally, the messenger service MS signs in the real third user process UP3 with the user identification code UIDUP3. Therefore, the first user process UP1 and the second user process UP2 are able to intercommunicate directly with the third user process UP3 again. However, as already mentioned above, the first user process UP1 and the second user process UP2 are not able to detect if they are intercommunicating directly with the real third user process UP3 or with the agent process AP logged in as virtual third user process.

Regarding the kind of communication messages it has to be remarked that the agent process (AP) 106, the database (DB) 401 and the memory should be designed such that they are able to process each kind of communication message. For example, the communication messages may comprise voice messages, mail messages and chat messages.

It has to be mentioned that even though only three user processes are shown in the embodiments of the invention there is no limitation to available or unavailable user processes in this invention. The agent process 106 is constantly connected via the communication management system 101 to the messenger service 102. Further, the agent process 106 is designed such that it can always monitor the availability of all registered user processes and that it can log in as a unique virtual user process for each unavailable user process at any time. There is also no limitation for the amount of virtual user processes which are handled by the agent process 106 simultaneously.

What is claimed is:

1. A method for user processes, each having a unique user identification code, to intercommunicate within a communication management system even if one of the user processes is unavailable, comprising the following steps:

associating an agent process with a particular user identification code in order to correspond to a first user process having the particular user identification code;

determining whether the first user process is available in the communication management system;

causing the agent process to log into the communication management system with the particular user identification code when the first user process is unavailable in the communication management system; and enabling the agent process to intercommunicate with the user processes within the communication management system instead of the first unavailable user process by using the particular user identification code of the unavailable first user process.

2. The method according to claim 1, wherein the intercommunication step of the agent process comprises receiving a message from an available user process.

3. The method according to claim 2, wherein the intercommunication step of the agent process further comprises intercommunicating with a database with respect to the received message from the available user process.

4. The method according to claim 3, wherein the intercommunication step of the agent process further comprises intercommunicating with the available user process with respect to information stored in the database.

5. The method according to claim 1, wherein the intercommunication step of the agent process comprises storing a message from an available user process if the message is not processable by the agent process.

6. A computer device for user processes, each having a unique user identification code, to intercommunicate within a communication management system even if one of the user processes is unavailable, comprising:

a processing unit being programmed such that it can perform the following steps:
associating an agent process with a particular user identification code in order to correspond to a first user process having the particular user identification code;
determining whether the first user process is available in the communication management system;
causing the agent process to log into the communication management system with the particular user identification code when the first user process is unavailable in the communication management system; and
enabling the agent process to intercommunicate with the user processes within the communication management system instead of the first unavailable user process by using the particular user identification code of the unavailable first user process.

7. The computer device according to claim 6, further comprising a database for enabling the agent process to intercommunicate with the available user process with respect to information stored in the database.

8. The computer device according to claim 6, further comprising a memory for storing a message of an available user process if the message can not be processed by the agent process with respect to information stored in the database.

* * * * *